Patented Aug. 2, 1938

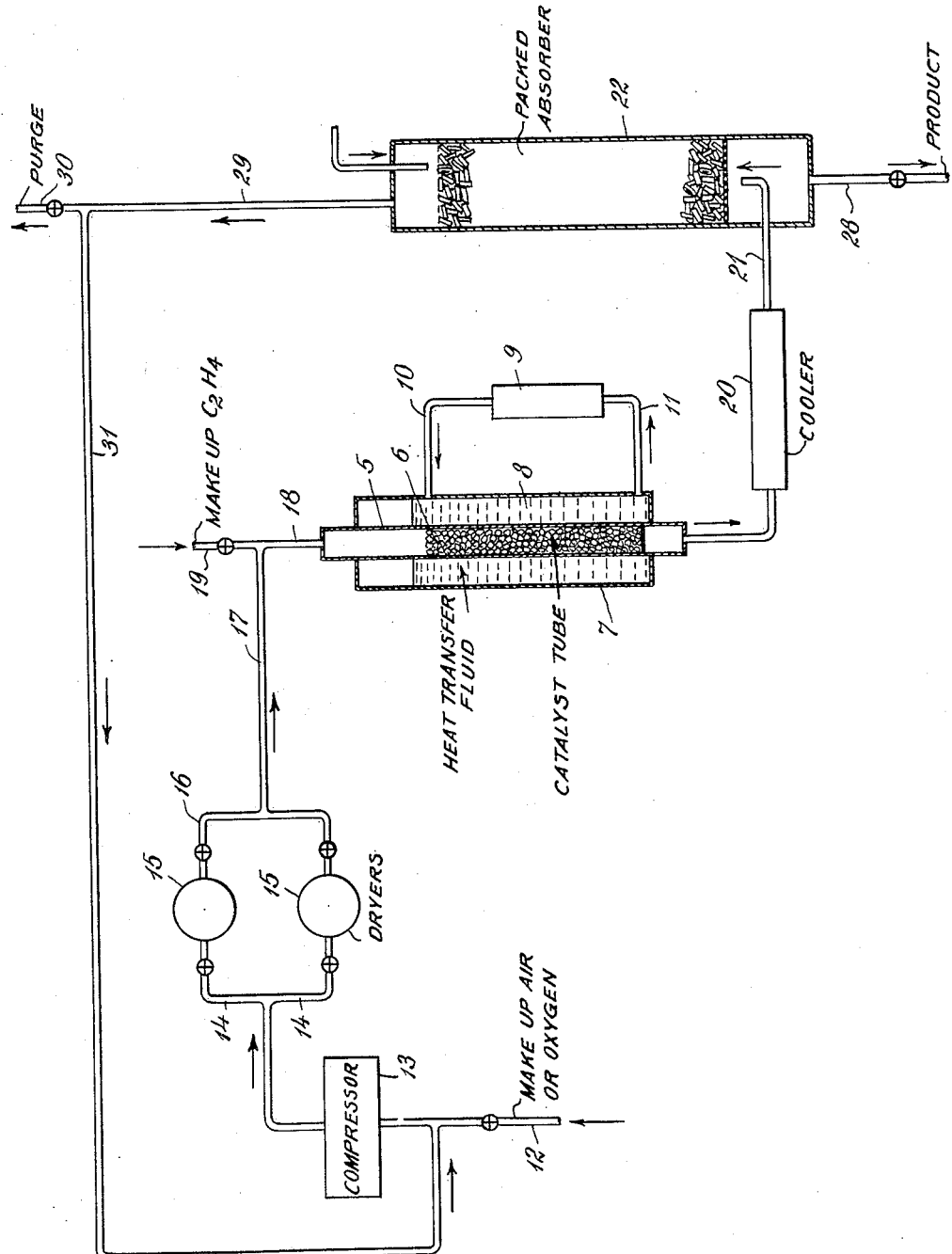

2,125,333

UNITED STATES PATENT OFFICE 2,125,333

PRODUCTION OF OLEFINE OXIDES

Ray M. Carter, Glenbrook, Conn., assignor, by mesne assignments, to U. S. Industrial Alcohol Company, New York, N. Y., a corporation of West Virginia Application May 8, 1937, Serial No. 141,422

12 Claims. (Cl. 260—54)

This invention relates to the production of ethylene oxides and derivatives therefrom and particularly to the oxidation of ethylene with oxygen or air and the recovery of ethylene oxide in commercially practicable quantities.

The oxidation of ethylene has been suggested heretofore but no practicable method has been available whereby ethylene oxide and its derivatives can be produced in commercial quantities as a result of the direct oxidation of ethylene. The yield of ethylene oxide by methods heretofore known or suggested is to small as not to warrant any hope of successful commercial application.

It is the object of the present invention to provide a simple and effective method readily adaptable for commercial application and capable of yielding ethylene oxides in quantities sufficient to warrant operation for industrial purposes.

Another object of the invention is the provision of a method of oxidizing ethylene under regulated conditions whereby the yield of ethylene oxide is materially increased and the certainty of successful operation is assured.

Other objects and advantages of the invention will be apparent as it is better understood by reference to the specification and accompanying drawing, which illustrates diagrammatically a flow-sheet including the apparatus adapted for practice of the invention, it being understood that some of this apparatus is not essential although the method may be conducted efficiently therein.

In carrying out the invention, a variety of factors require careful regulation as hereinafter more fully explained. In general the method depends upon the selection of a suitable catalyst and the arrangement of the catalyst to permit the passage of gas mixtures including ethylene and oxygen therethrough under regulated temperature conditions to insure the desired results. The gaseous mixture which is delivered to the catalyst consists of oxygen, with or without diluents, with a carefully regulated proportion of ethylene admixed therewith. Conveniently the source of oxygen is air carrying nitrogen as a natural diluent. Oxygen may however be supplied from any suitable source, and inert diluents including nitrogen, carbon dimoxide, etc., can be added to the mixture in proper proportions to facilitate the reaction.

Water or water vapor is not a desirable constituent of the gaseous mixture, and preferably the oxygen or air supplied is initially freed from its moisture content by suitable means provided for that purpose. While it is not essential that every trace of water be removed from the entering gas mixture, I believe it to be desirable to eliminate substantially all moisture from the gaseous mixture prior to its delivery to the catalyst chamber. This is most readily accomplished by passing air, after compression to a pressure sufficient to cause the gas to travel through the apparatus at the desired velocity, through a suitable desiccating material which is adapted to absorb the moisture. The air thus freed from moisture is then mixed with the desired proportion of ethylene or ethylene-containing gases supplied at the pressure of the entering air.

This mixture, which may contain approximately 1 to 10% of ethylene by volume, is delivered to the catalyst chamber containing preferably a catalyst in the form of nodules or other relatively small pieces so that the gaseous mixture travels therethrough with the maximum possible surface contact. The temperature of the reaction is maintained in any suitable manner, but preferably by surrounding the catalyst chamber with a jacket containing a heat transfer fluid maintained at a suitable temperature. The temperaure of the catalyst may be thus raised and thereafter maintained at the proper level, any surplus heat generated within the catalyst being automatically withdrawn by transfer to the fluid.

The catalytic reaction within the chamber converts a substantial proportion of the ethylene into ethylene oxide, the reaction being in the nature of a selective oxidation. The gaseous mixture containing ethylene oxide is withdrawn from the catalyst chamber and, after cooling in a suitable apparatus, the mixture is delivered to an absorber in which the ethylene oxide is selectively separated from the remainder of the gaseous mixture which may be discharged then to the atmosphere or re-circulated as may be desired. Absorption of the ethylene oxide is accomplished by supplying a suitable liquid absorbing agent, such as water.

In order that the invention may be more clearly understood, reference is made to the accompanying drawing in which 5 indicates a tubular chamber or plurality of tubular chambers containing the catalyst 6. The chamber or chambers are surrounded by a jacket 7 adapted to contain a heat transfer fluid 8 which may be circulated through an apparatus 9, and there heated or cooled, by means of pipes 10 and 11, which deliver the fluid to and from the jacket. The temperature to be maintained is preferably within the range of 100° to 450° C.

Oxygen, or gaseous mixtures containing oxygen, such as air, is supplied through a pipe 12 to a compressor 13 wherein it is compressed to a suitable pressure adapted to insure the travel of the gaseous mixture through the apparatus at satisfactory velocity. The oxygen or oxygen-containing mixture is delivered through pipes 14 to one or the other of two dryers 15 which are filled with a suitable desiccating material such as alumina, silica gel, calcium chloride or any of the well known desiccating agents adapted to remove the moisture from gases. Two dryers are provided in order that one may be revivified or replenished by the application of heat or otherwise while the other is in use. After drying, the oxygen-containing mixture is delivered through the pipes 16 and 17 to the inlet pipe 18. At this point ethylene or ethylene-containing gas is introduced through a pipe 19 and mingled with the oxygen-containing gas, the mixture being supplied to the catalyst chamber.

Variety of catalysts may be employed. I have found that the most effective catalyst consists of silver on a carrier which is substantially aluminum oxide preferably admixed with a small proportion of aluminum silicate such as clay. Manufactured aluminum oxide such a "Alundum" affords a very satisfactory carrier, particularly when combined with a small proportion of clay. It is not essential to include clay in the carrier.

The reaction between ethylene and the oxygen in the gaseous mixture proceeds more or less uniformly in contact with the catalyst but zones of excessive temperature or "hot spots" may and do develop from time to time at various points in the catalyst bed. It is essential therefore that the dimensions of the catalyst chamber be such as to permit the withdrawal of excess heat promptly from various parts of the catalyst bed and that a uniform temperature be maintained by use preferably of a suitable heat transfer fluid in the jacket 8.

The gaseous mixture leaving the catalyst may contain from a fraction to one or more percent of ethylene oxide. This gaseous mixture is conveyed through a cooler 20 of any suitable form and thence through a pipe 21, to an absorber 22. The absorber is a column which may be filled with any suitable packing or trays to facilitate breaking up the absorbing liquid to afford the maximum possible surface contact with the gaseous mixture. The absorbing liquid may be water or other suitable solvent. The liquid is supplied through a pipe 23. The liquid is withdrawn from the absorber through a pipe 28, carrying the ethylene oxide product of the operation. The unabsorbed gaseous mixture escapes through a pipe 29 and may be discharged to the atmosphere through a pipe 30. If desired a portion of the gaseous mixture which may contain some ethylene can be returned through a pipe 31 and mixed with the air entering the compressor 13, thus affording a cyclic operation and saving a certain proportion of the ethylene which would be discharged otherwise to the atmosphere.

In place of absorption of the ethylene oxide in a liquid absorption agent, it is possible to selectively absorb the ethylene oxide product in charcoal or similar activated absorption materials. In that case, the absorption tower is packed with the absorption material, but no liquid is supplied. Otherwise the absorption step is substantially the same.

I have discovered that an essential element to the successful operation of the method is avoidance of "hot spots" in the catalyst bed. Two major reactions are possible in the catalyst bed; one, the desired reaction in this case is the oxidation of ethylene to ethylene oxide. The amount of heat liberated by this reaction is relatively small, and the temperature of the catalyst bed is consequently slightly above that maintained in the surrounding jacket so long as the reaction is functioning in accordance with the purpose of the invention. The other, an undesired reaction, is the oxidation of ethylene to carbon dioxide and water. The heat of reaction in this case is considerably greater, and the "hot spot" resulting from this reaction is propagated through the catalyst bed. To control the operation, suitable indicating devices, for example, a carbon dioxide recorder, may be employed to indicate any abnormal operation. Adjustment of the temperature of the jacket or modification of the proportions of constituents of the gaseous mixture will correct this condition.

In carrying out the invention, the catalyst is prepared as follows, it being understood that this represents a preferred embodiment of the invention and is here described as an example. In preparing the catalyst, I employ aluminum oxide ("Alundum") in which 10% of clay (principally aluminum silicate) has been bonded. The carrier consisting essentially of aluminum oxide and aluminum silicate is broken into fragments of suitable dimensions, roughly ⅜ by ½ inch, and is then thoroughly soaked in a water solution of silver nitrate of sufficient strength to afford about 10% of silver on the finished catalyst. The solution containing the carrier is evaporated to dryness. The carrier with the silver nitrate thereon is then subjected to reduction with hydrogen at a temperature of approximately 300° C. The carrier is thus impregnated with catalytic silver, and the catalyst is particularly active in the reaction involving the oxidation of ethylene. The impregnation of the carrier with silver may be accomplished in any convenient way. The method described affords, so far as I have observed, the most practicable and efficient operation, as well as a satisfactory catalyst having a relatively long life and superior activity.

Although the silver nitrate is indicated as a suitable medium for the addition of silver to the carrier, other silver compounds can be employed, as for example, silver chloride, carbonate, hydroxide or cyanide.

In a preferable embodiment of the invention, approximately 10% by weight of silver on the carrier produces, so far as I have observed, satisfactory results. It is however practicable to use greater or lesser quantities of silver in the catalyst. For example, from 1 to 50% by weight of the finished catalyst, depending upon the character and porosity of the carrier, may be used.

Although I prefer to reduce silver compounds on the carrier by hydrogen in the manner hereinbefore described, any of the well known methods of reduction, as for example with alcohol or even by heat alone, may be employed. The catalyst may be reduced externally of the catalyst chamber and introduced thereto, or reduction may be carried out within the catalyst chamber.

While I do not wish to be limited to any particular theory, I believe that the catalyst is promoted by the presence of very small proportions of alkaline or alkaline earth metals which may be introduced through the inclusion of clay in the carrier or by the deliberate addition of alkali or alkaline earth metal compounds such as compounds of sodium, potassium, calcium, etc. For example, the addition of calcium compounds or of sodium compounds to the carrier materially improves the yield of ethylene oxide when the catalyst is employed in the manner hereinbefore described. Moreover, it appears that the addition of small amounts of alkali and alkaline earth metals or compounds thereof to the carrier materially improves the ruggedness of the catalyst, thereby extending its life. The effect of catalyst poisons, if any are present, is to some extent or entirely obviated by the inclusion of these materials in the carrier.

The carrier may be in rough broken pieces of the size approximately indicated. On the other hand, I have utilized successfully catalysts prepared with the carrier in more regular forms, as for example, pellets, rings, etc. The particular form of the carrier is not important except in so far as it affords maximum surface contact with the gaseous mixture and thus reduces the necessary size of the catalyst chamber or increases the efficiency of an apparatus of given size.

As an example of practical operation, I employed, as a catalyst chamber, a tube having an internal diameter of two inches and a length of sixteen feet. Twelve feet of the tube was filled with the catalyst prepared as hereinbefore described. The temperature of the jacket surrounding this tube was 315° C. The method was operated by cycling the gaseous mixture at the rate of 750 cu. ft. per hour. To this was added 170 cu. ft. of air per hour and 13 cu. ft. of ethylene per hour. The ethylene oxide produced per hour was 5.4 cu. ft., or in other words, 41.5% of the ethylene entering the system was converted into ethylene oxide.

In another instance, when feeding 145 cu. ft. of air per hour, 39.9% of the ethylene entering the system was converted into ethylene oxide.

In still another case, when feeding 120 cu. ft. of air, 38% of all the ethylene entering the system was converted into ethylene oxide.

The catalyst as described in the present application is separately claimed in applicant's copending application Serial No. 142,731, filed May 15, 1937.

The details of the apparatus as described herein are not essential to the invention, and various changes may be made in the form and construction thereof, as well as in the catalyst and procedure, without departing from the invention or sacrificing any of its advantages.

I claim:

1. The method of producing ethylene oxides which comprises subjecting a gaseous mixture comprising ethylene and oxygen to contact with a catalyst consisting of a carrier which is essentially fused aluminum oxide and silver, and selectively absorbing the ethylene oxide from the gaseous mixture.

2. The method of producing ethylene oxides which comprises subjecting a gaseous mixture comprising ethylene and oxygen to contact with a catalyst consisting of a carrier which is essentially fused aluminum oxide and silver, maintaining a substantially uniform temperature in the reaction zone, selectively absorbing the ethylene oxide from the gaseous mixture.

3. The method of producing ethylene oxide which comprises subjecting a substantially dry gaseous mixture comprising ethylene and oxygen to contact with a catalyst consisting of a carrier, which is essentially aluminum oxide, and silver, and selectively absorbing the ethylene oxide from the gaseous mixture.

4. The method of producing ethylene oxide which comprises subjecting a substantially dry gaseous mixture comprising ethylene and oxygen to contact with a catalyst consisting of a carrier, which is essentially aluminum oxide, and silver, maintaining a substantially uniform temperature in the reaction zone, and selectively absorbing the ethylene oxide from the gaseous mixture.

5. The method of producing ethylene oxide which comprises subjecting a substantially dry gaseous mixture comprising ethylene and oxygen to contact with a catalyst consisting of a carrier, which is essentially aluminum oxide containing a proportion of clay, and silver, and selectively absorbing the ethylene oxide from the gaseous mixture.

6. The method of producing ethylene oxide which comprises subjecting a substantially dry gaseous mixture comprising ethylene and oxygen to contact with a catalyst consisting of a carrier, which is essentially aluminum oxide promoted by one of the metals of the alkali and alkaline earth metal groups, and silver, and selectively absorbing the ethylene oxide from the gaseous mixture.

7. The method of producing ethylene oxide which comprises subjecting a gaseous mixture comprising ethylene and oxygen contact with a catalyst consisting of a carrier which is essentially fused aluminum oxide and silver, maintaining a substantially uniform temperature in the reaction zone, and selectively absorbing the ethylene oxide from the gaseous mixture.

8. The method of producing ethylene oxide which comprises subjecting a gaseous mixture comprising ethylene and oxygen to contact with a catalyst consisting of a carrier which is essentially fused aluminum oxide and silver, maintaining a substantially uniform temperature in the reaction zone, selectively absorbing the ethylene oxide from the gaseous mixture, and returning a portion of the residual gaseous mixture with additions of ethylene and oxygen to the catalyst.

9. The method of producing ethylene oxide which comprises subjecting a substantially dry gaseous mixture comprising ethylene and oxygen to contact with a catalyst consisting of a carrier, which is essentially fused aluminum oxide, and silver, and selectively absorbing the ethylene oxide from the gaseous mixture.

10. The method of producing ethylene oxide which comprises subjecting a substantially dry gaseous mixture comprising ethylene and oxygen to contact with a catalyst consisting of a carrier, which is essentially fused aluminum oxide, and silver, maintaining a substantially uniform temperature in the reaction zone, and selectively absorbing the ethylene oxide from the gaseous mixture.

11. The method of producing ethylene oxide which comprises subjecting a substantially dry gaseous mixture comprising ethylene and oxygen to contact with a catalyst consisting of a carrier, which is essentially fused aluminum oxide containing a proportion of clay, and silver, and selectively absorbing the ethylene oxide from the gaseous mixture.

12. The method of producing ethylene oxide which comprises subjecting a gaseous mixture comprising ethylene and oxygen to contact with a catalyst consisting of a carrier, which is essentially aluminum oxide, and silver.

RAY M. CARTER.